(12) United States Patent
Kiest, Jr.

(10) Patent No.: US 8,118,063 B2
(45) Date of Patent: Feb. 21, 2012

(54) METHOD AND APPARATUS FOR LINING A PIPE

(75) Inventor: Larry W Kiest, Jr., Ottawa, IL (US)

(73) Assignee: LMK Enterprises, Inc., Ottawa, IL (US)

( * ) Notice: Subject to any disclaimer, the term of this patent is extended or adjusted under 35 U.S.C. 154(b) by 114 days.

(21) Appl. No.: 12/713,619

(22) Filed: Feb. 26, 2010

(65) Prior Publication Data

US 2010/0212766 A1  Aug. 26, 2010

Related U.S. Application Data

(60) Provisional application No. 61/155,742, filed on Feb. 26, 2009.

(51) Int. Cl.
*F16L 55/16* (2006.01)

(52) U.S. Cl. ......... 138/98; 138/97; 156/461; 405/150.1; 264/269

(58) Field of Classification Search ............ 138/98, 138/97; 156/461; 405/150.1; 264/269, 36.16
See application file for complete search history.

(56) References Cited

U.S. PATENT DOCUMENTS

| | | | | |
|---|---|---|---|---|
| 4,995,761 | A * | 2/1991 | Barton | 405/184.1 |
| 5,186,987 | A * | 2/1993 | Imoto et al. | 428/34.5 |
| 5,354,586 | A * | 10/1994 | Yokoshima et al. | 428/36.1 |
| 5,698,056 | A * | 12/1997 | Kamiyama et al. | 156/218 |
| 6,019,136 | A * | 2/2000 | Walsh et al. | 138/98 |
| 2002/0083990 | A1* | 7/2002 | Lundman | 138/98 |
| 2003/0066567 | A1* | 4/2003 | Manners | 138/98 |
| 2006/0130923 | A1* | 6/2006 | Lepola et al. | 138/98 |
| 2007/0113971 | A1* | 5/2007 | Driver et al. | 156/287 |
| 2007/0240827 | A1* | 10/2007 | Driver | 156/461 |
| 2008/0251151 | A1* | 10/2008 | Tanaka et al. | 138/98 |

* cited by examiner

Primary Examiner — Patrick F Brinson
(74) Attorney, Agent, or Firm — McKee, Voorhees & Sease, P.L.C.

(57) ABSTRACT

A new apparatus for repairing a damaged portion of a pipe includes a liner having a tubular sleeve of resin absorbent material that is capable of being stretched circumferentially and a plastic film laminated to an exterior surface of the sleeve. The plastic film contains resinous material in the liner until the liner is stretched circumferentially to thereby breech the integrity of the plastic film and expose the resinous material to a damaged section of pipe in need of repair. A method of lining a damaged section of pipe using the liner is also provided.

23 Claims, 5 Drawing Sheets

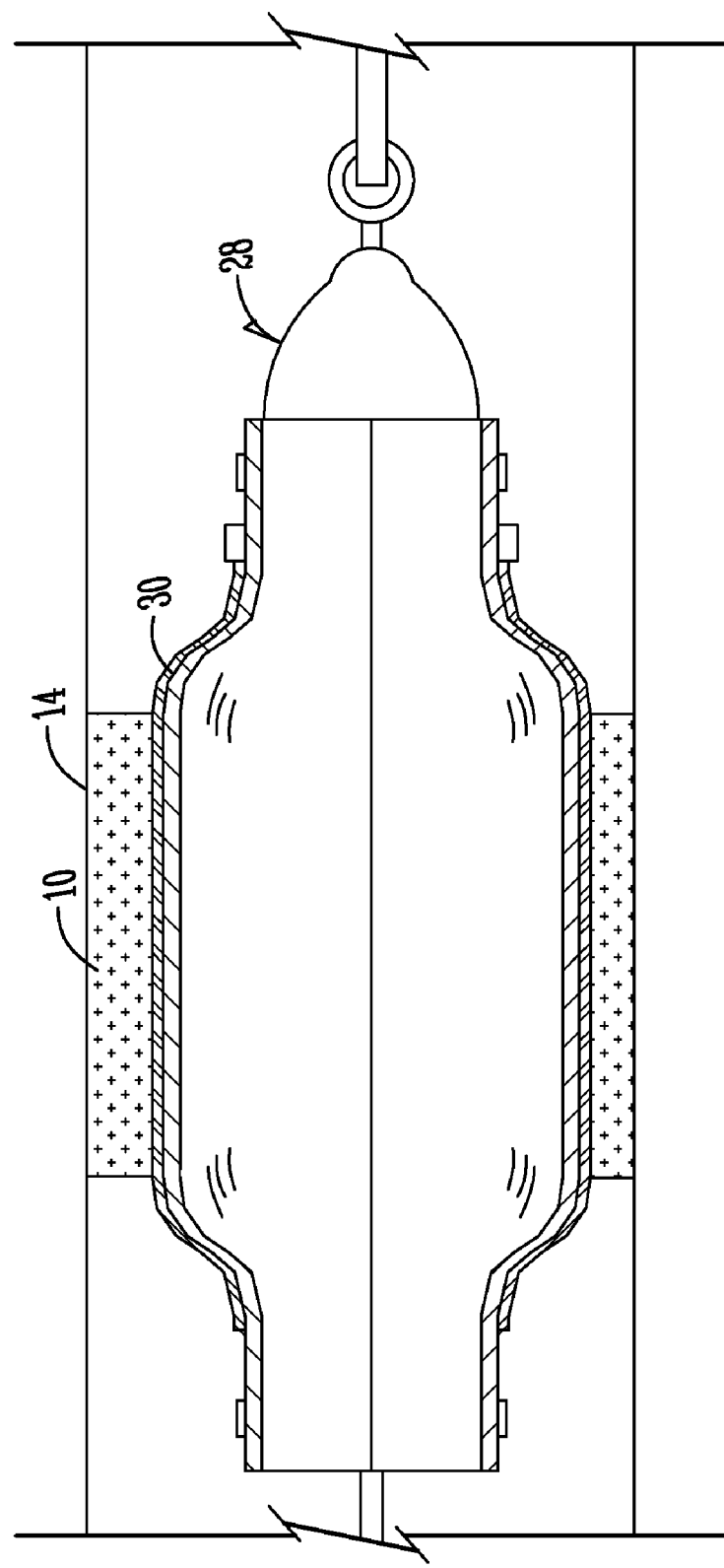

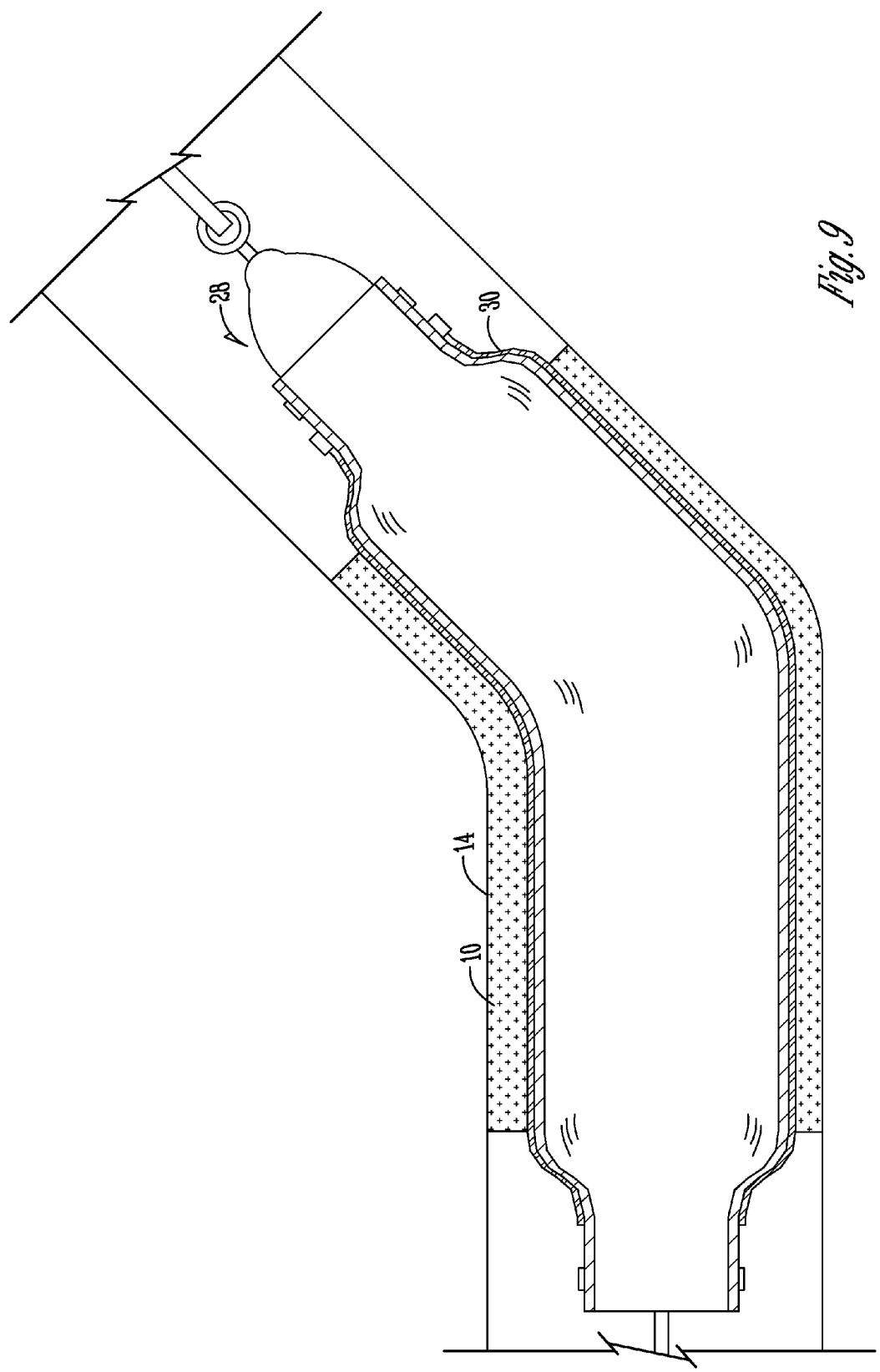

METHOD AND APPARATUS FOR LINING A PIPE

CROSS-REFERENCE TO RELATED APPLICATIONS

This application claims priority under 35 U.S.C. §119 of a provisional application Ser. No. 61/155,742 filed Feb. 26, 2009, which application is hereby incorporated by reference in its entirety.

BACKGROUND OF THE INVENTION

The present invention relates to an apparatus and method for repairing pipe, such as underground sewer pipe and the like.

Prior methods for repairing damaged sections of pipe include moving a liner tube impregnated with a resinous material capable of curing and hardening to a position within the pipe where the damaged portion is located. Once the liner tube is positioned within the host pipe, it is pressurized, causing the liner to press against the interior wall of the host pipe, and the liner is cured by applying heat, such as with steam or hot water. These liners can also be cured at ambient temperatures by a chemical mixture which generates an exothermic reaction or by ultraviolet light. The liner tube forms an interior liner in the pipe for the pipeline being repaired. Such a process is commonly known as cured-in-place pipe-lining.

The liner tube is positioned within the pipe by pulling, pushing or inverting the liner. Pulling or pushing a liner into position within a pipe can be an efficient process, particularly in situations where the liner must only travel a short distance and need not navigate significant bends in the pipe. Typically, a flat sheet liner is wrapped around an inflation plug to form a tube with the longitudinal edges of the sheet overlapping. The inflation plug with liner is then pushed or pulled into position adjacent the damaged section of pipe.

Although a pull-in-place or push-in-place installation is feasible in many instances, problems remain. For example, prior art lining tubes are typically made of a fabric material that is resin absorbent. Once the resin is applied to the liner, there is nothing around the outside of the liner to contain the resin. Consequently, resin is wiped off of the liner when the liner rubs against the interior of the host pipe as the liner is either pulled or pushed into position. Workers must also take great care so as to not come into contact with the resin and also avoid contaminating the exposed resin impregnated liner.

Prior art liners pushed or pulled in place are also not well suited for lining at bends in the pipeline. Flat sheet liners with overlapping edges are not capable of stretching or expanding sufficiently to avoid folds in the liner when pressed against the interior of the host pipe. In addition, flat sheet style liners must be banded, strapped, tied or otherwise attached with fasteners to the inflation plug to avoid falling off the plug prior to inflating the plug and pressing the liner against the interior of the host pipe.

In light of the foregoing, the primary objective of the present invention is to provide an improved method and apparatus for lining pipe.

Another objective of the present invention is to provide a new resin absorbent liner that contains the resin in the liner prior to stretching the liner and pressing it against the interior of the host pipe.

Another objective of the present invention is to provide a new lining apparatus for pull-in-place or push-in-place applications that prevents resin from being wiped off of the liner as it is moved into the pipe, yet allows the resin to contact the interior of the host pipe once the liner is expanded or stretched under pressure.

Another objective of the present invention is to provide a new lining apparatus and method for effectively lining at bends and turns in the pipeline.

A still further objective of the present invention is to provide a new lining apparatus which is economical to manufacture, durable in use and efficient in operation.

SUMMARY OF THE INVENTION

According to one aspect of the present invention, an apparatus for repairing a damaged portion of a pipe is provided. The apparatus includes a liner with a tubular sleeve of a resin absorbent material that is capable of being stretched circumferentially and a plastic film disposed on an exterior surface of the sleeve. Once the liner is impregnated with a resinous material, the plastic film contains the resin and prevents the resin from being wiped off of the liner while outside of the pipe and as the liner is being moved to an operative position adjacent the damaged section of pipe in need of repair. Stretching the liner circumferentially toward the damaged section of pipe breeches the integrity of the plastic film to expose the resinous material and tubular sleeve to the damaged section of the pipe.

In a preferred form of the invention, the plastic film is a TPU or like polymer film with a wall thickness of approximately 1-2 mils that is laminated to the sleeve. The preferred tubular sleeve is also capable of being stretched to a diameter of at least approximately 100% greater than its non-stretched diameter. Allowing the sleeve to stretch to such an extent allows the sleeve to conform to the shape of the pipe even at bends and curves in the pipeline without creating undesirable folds in the liner.

Another aspect of the invention is a new method of lining a damaged section of pipe using a liner having a tubular sleeve of resin absorbent material and a plastic film laminated to an exterior surface of the sleeve. The liner is impregnated with a resinous material capable of curing and hardening. The liner is moved into the pipe to a position adjacent the damaged section of the pipe. Once in position, the liner is stretched circumferentially toward the damaged section of pipe to thereby breech the integrity of the plastic film and expose the resinous material in the tubular sleeve to the damaged section of the pipe. The liner is pressed against the damaged section of a pipe, allowing the resinous material to cure and harden.

In a preferred form of the method, the liner is positioned on an inflatable plug with a substantially non-stick bladder material located therebetween. The tubular non-stick bladder material is banded to the front end of the inflatable plug such that the bladder material peels away from the cured liner as the inflatable plug is removed.

BRIEF DESCRIPTION OF THE DRAWINGS

FIG. 8 is a sectional view at the damaged section of pipe after the liner has been stretched and pressed against the interior of the pipe.

FIG. 9 is a sectional view similar to FIG. 8, showing the liner pressed against a bend in the pipeline.

DETAILED DESCRIPTION OF THE PREFERRED EMBODIMENT

Figure 1:
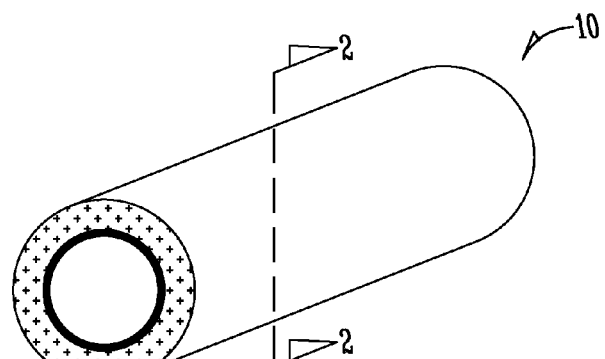
FIG. 1 is a perspective view of a liner from a preferred embodiment of the present invention.
Figure 2:
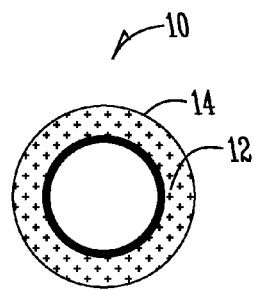
FIG. 2 is a sectional view of the liner in FIG. 1 taken along line 2-2 in FIG. 1.

FIG. 1 shows a perspective view of a preferred liner 10 of the present invention. The liner 10 is formed by a tubular sleeve 12 including a fabric fiber material which can preferably be stretched circumferentially up to at least approximately 100% of its non-stretched diameter. The sleeve 12 is preferably formed from a sheet of material stitched about its longitudinal edges. A preferred fabric for the sleeve 12 is a material known as "stitch bond" distributed by LMK Enterprises, Inc. of 1779 Chessie Lane, Ottawa, Ill. 61350.

The preferred liner 10 also includes a plastic film 14 laminated to an exterior surface of the tubular sleeve 12. The preferred plastic film 14 has a thickness of approximately 1-2 mils and is made of TPU, but could be made of PVC or a similar polymer film. The plastic film 14 is cured and then laminated to the sleeve 12 using an adhesive or glue as is known in the art.

Figure 3:
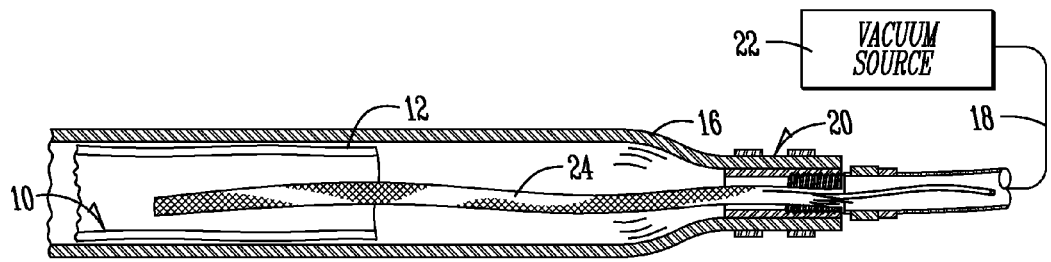
FIG. 3 is a sectional view of the preferred liner of the present invention ready for impregnation of a thermal-set resin using a vacuum process.
Figure 4:
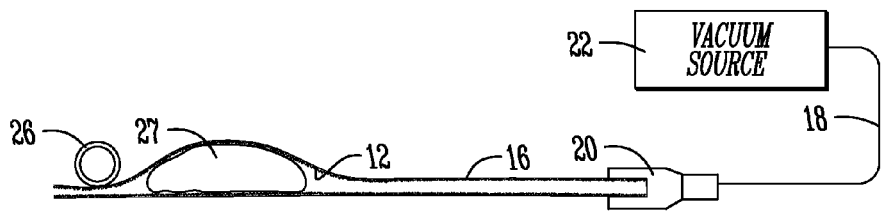
FIG. 4 is a schematic view showing the vacuum impregnation process.

The sleeve 12 is impregnated with a resin, preferably a thermal-set resin, which is forced into the fabric fibers. A method of impregnating the sleeve 12 with the resin is shown in FIGS. 3 and 4. More particularly, the fabric fibers of the sleeve 12 are on the inside of the sleeve with the plastic film 14 on the exterior of the sleeve 12. One end of the sleeve 12 is connected to a vacuum bag using tape or other adhesive. The opposite end of the vacuum bag 16 is connected to a vacuum hose 18 through a threaded coupling 20. The vacuum hose 18 is connected to a vacuum source 22, as seen in FIGS. 3 and 4. A wick 24 extends through the length of the vacuum bag 16 and functions to expel air from the sleeve 12 during the resin impregnation process.

As shown in FIG. 4, a slug 27 of resin is introduced into the open end of the sleeve 12 and is forced through the sleeve so as to impregnate the fabric fibers. A pipe 26 may be rolled over the sleeve 12 so as to push the resin 27 through the sleeve. Simultaneously or alternatively, the vacuum source 22 can be activated to pull the resin slug 27 through the sleeve 12, thereby coating and impregnating the fabric fibers with the resin. After this resin impregnation process is completed, the sleeve 12 is in the form of a flattened tube with the plastic film 14 still on the outside and the resin coated fibers on the inside. As an alternative to the vacuum impregnation process, the resin can be poured into the liner tube and then pressed into the fibers by a person or other means in a manual impregnation process.

Once the liner 10 is impregnated with resin, the plastic film 14 on the outside of the sleeve 12 helps to contain the resin and prevent it from being wiped off or coming into contact with persons or objects prior to stretching the sleeve 12 and pressing the liner 10 against the interior of host pipe at the damaged section of pipe. The plastic film 14 is very thin to begin, preferably 1-2 mils thick. As the sleeve 12 stretches or expands radially outwardly, the plastic film 14 becomes even thinner and eventually the stretching of the sleeve 12 breeches the structural integrity of the plastic film 14, which becomes extremely porous. This unique characteristic of the plastic film 14 helps contain the resin in the liner 10 prior to stretching the tubular sleeve 12 and pressing the liner 10 against the damaged section of pipe.

The liner 10 is preferably installed in the pipe by using an inflatable plug. Inflatable plugs normally include an inflatable rubber sleeve secured between end plates. Inflatable plugs for installing cured-in-place liners are well known in the art. For example, push-type and pull-type inflatable plugs are available from Logiball, Inc. of 440 Papin Street, Quebec, QC G1P3 T9 and 21 Long Pond Road, Jackman, Me. 04945. Push-type inflatable plugs are often used when the liner must only be moved a relatively short distance within the pipe or there is no convenient downstream manhole or other access point from which to pull in the plug. For example, a push-type inflatable plug may be used to push a liner through a cleanout and into a lateral sewer pipe for a spot repair on a damaged portion of the lateral pipe. A rigid hose assembly can be used to push the inflatable plug with liner through the pipe, as is known in the art. Alternatively, an air hose with fiberglass push rod disposed therein can be used. The fiberglass push rod provides for greater stiffness when pushing the plug long distances, and the push rod can be sized so as to allow for air to pass through the hose and inflate the plug. A sealing gland with O-ring allows the hose with rod to slide forward within the plug into contact with the leading end of the plug, which aids in pushing the plug through the pipe. Similarly, the hose with rod can be pulled back until stopped by a retaining ring at the opposite end of the plug, which aids in pulling the plug out of the pipe after installation of the liner.

Figure 5:
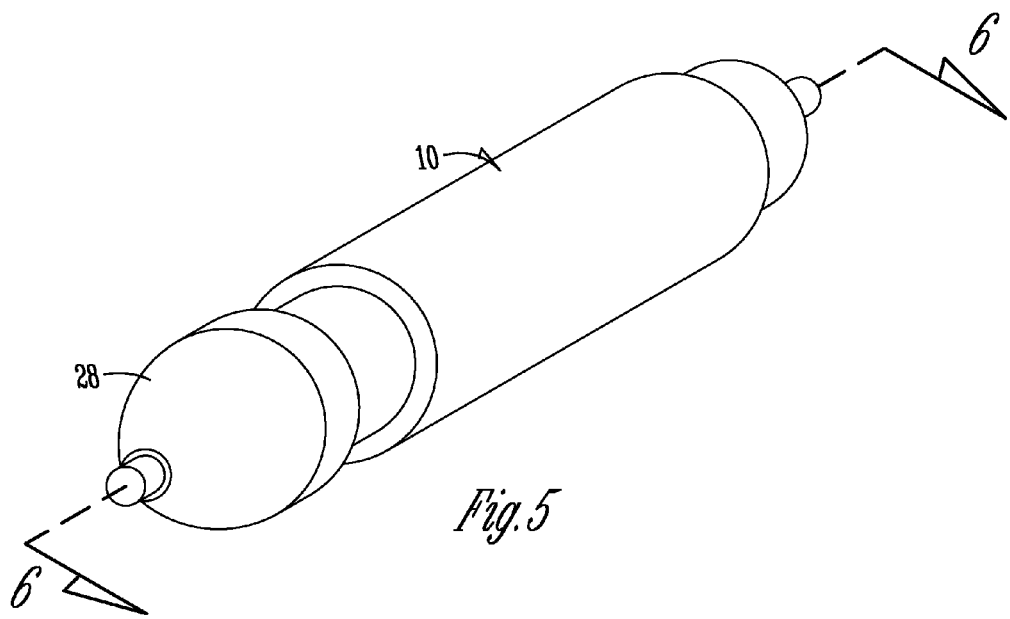
FIG. 5 is a perspective view of the preferred liner mounted on an inflatable plug.

After the liner 10 has been "wet out" with resin, the liner is pulled over an inflatable plug 28. A liner 10 mounted on the inflatable plug 2 is shown in FIG. 5. The elastic properties of the liner 10 allow it to stay in place on the inflatable plug 28 without the use of bands, straps, strings or other fasteners.

Figure 6:
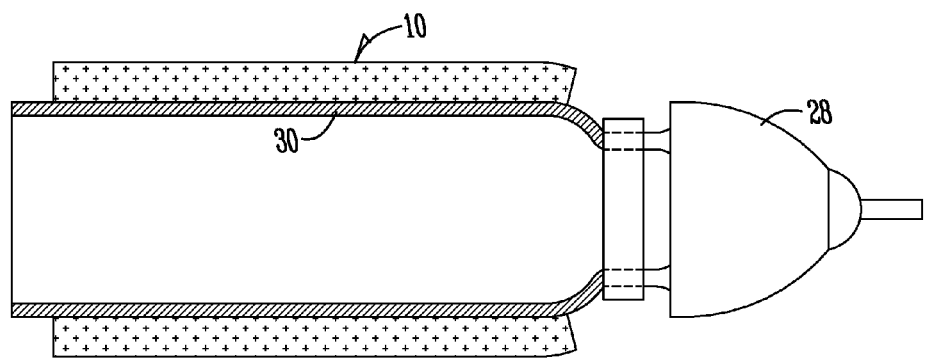
FIG. 6 is a cross-sectional view of the device shown in FIG. 5 taken along line 6-6 in FIG. 5.

A cross-sectional view of the assembly in FIG. 6 shows a tubular sleeve of non-stick bladder material 30 disposed between the inflatable plug 28 and the liner 10. The purpose of the non-stick sleeve of bladder material 30 is to facilitate removal of the plug 28 after the liner 10 has cured and hardened in the pipe. The non-stick bladder material is preferably formed from a fiber reinforced non-stick plastic material, which includes a scrim reinforcing fabric coated with a translucent or semi-transparent thermo plastic elastomer, such as a thermo plastic polyolefin (TPO) or vulcanizate (TPUV). The preferred non-stick bladder material is disclosed in application Ser. No. 12/026,209, the contents of which are incorporated herein by reference.

The non-stick sleeve 30 is preferably attached to the inflation plug 28 by banding a non-stick sleeve to the front end of the plug. Banding the non-stick sleeve 30 to the front end of the plug 28 maintains the non-stick sleeve in place as the inflatable plug is pulled or pushed into position along the pipe. Banding only at one end also causes the non-stick sleeve 30 to invert during removal of the inflation plug 28, which facilitates separation of the non-stick sleeve 30 from the liner 10 once the liner is cured and hardened in the pipe.

Figure 7:
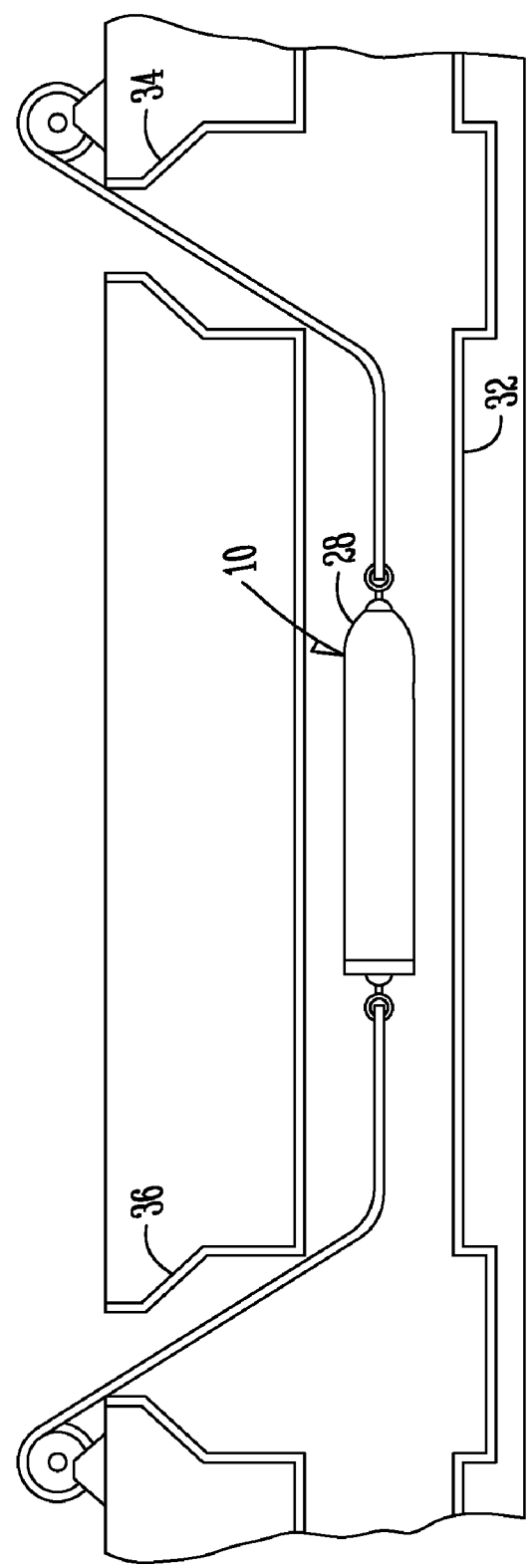
FIG. 7 is a schematic view illustrating a preferred method of the present invention for repairing a portion of a damaged pipeline extending between two manholes.

FIG. 7 shows a sectional view of a main sewer pipe 32 in communication with an upstream manhole 34 and downstream manhole 36. To perform a spot repair in a main sewer pipe 32 using a pull-in-place process, the inflatable plug 28 with liner 10 is introduced into the main pipe through one of the manhole openings. The plug 28 is drawn into the pipe 32 by means of a winch cable attached to the front end of the plug and extending through an upstream manhole or other access point. As the inflatable plug 28 with liner 10 moves through the pipe 32, the plastic film 14 prevents the resin from wiping off on the pipe.

Once the inflation plug 28 with liner 10 is moved into operative position adjacent the damaged section of pipe, the inflation plug is inflated with air or other liquid under pressure from a convenient fluid source, causing the liner to stretch radially outwardly toward the interior of host pipe. Stretching the liner 10 breeches the structural integrity of the plastic film 14 on the outside of the sleeve 12. This allows the resin and sleeve 12 to become exposed to the host pipe. The liner 10 continues to stretch under pressure and is pressed against the interior of the host pipe, allowing the liner to cure and harden. The inflation plug 28 remains inflated while the resin cures. Upon curing of the resin, the liner 10 is bonded and mechanically adhered to the interior of the pipe 32. The expansion of the inflatable plug 28 assures that no angular spaces reside between the liner 10 and the host pipe. Also, the stretching of the sleeve 12 from a first unstretched diameter to an enlarged diameter matching the contours of the interior of the host pipe precludes undesirable folds in the liner 10. The liner 10 is preferably sized to stretch in the pipe to a diameter at least 50% greater than the pre-inflation diameter. In a most preferred form, the liner 10 is sized approximately half of the internal diameter of the host pipe. The liner 10 should stretch such that it conforms to the shape of the pipe without folds in the liner. Stretching the sleeve 12 also enables the liner 10 to be used at bends or turns in the pipe. This is illustrated in FIG. 9.

After the resin cures, the inflation plug 28 is deflated and removed from the cured liner 10. Removing the inflation plug 28 causes the non-stick sleeve 30 to invert and pull away from the interior of the cured liner 10.

FIG. 8 is a sectional view of the lining apparatus with the inflatable plug 28 inflated, pressing the liner 10 against the host pipe. As illustrated in FIG. 8, the plastic film previously on the outside of the sleeve has lost its structural integrity and becomes part of the resin/liner material mechanically adhered to the host pipe.

Although FIGS. 7 and 8 illustrate a pull-in-place style installation, persons skilled in the art having the benefit of this disclosure will recognize that the lining methods and apparatus disclosed herein are also applicable to push-in-place installations.

The invention has been shown and described above with reference to the preferred embodiments, and it is understood that many modifications, substitutions, and additions may be made which are within the intended spirit and scope of the invention.

The invention claimed is:

1. An apparatus for repairing a damaged portion of a pipe, the apparatus comprising:
    a liner including a tubular sleeve of resin absorbent material that is capable of being stretched circumferentially and a plastic film disposed on an exterior surface of the sleeve;
    the liner having an unstretched state wherein the plastic film is solid and stretched state wherein in the plastic film is porous to expose a resinous material in the sleeve to the damaged section of the pipe.

2. The apparatus of claim 1 wherein the plastic film has a thickness of approximately 1-2 mils.

3. The apparatus of claim 1 wherein the plastic film is formed from a TPU material.

4. The apparatus of claim 1 wherein the plastic film is formed from a PVC material.

5. The apparatus of claim 1 wherein the tubular sleeve includes a fabric fiber material.

6. The apparatus of claim 1 wherein the tubular sleeve having a non-stretched diameter and being stretchable to a diameter at least 50% greater than the non-stretched diameter.

7. The apparatus of claim 1 wherein the liner being impregnated with resin and the plastic film contains the resin in the liner prior to installation of the liner.

8. An apparatus for repairing a damaged portion of a pipe, the apparatus comprising:
    an elongated inflatable plug;
    a liner positioned around the plug, the liner including a tubular sleeve of resin absorbent material that is capable of being stretched circumferentially and a plastic film adhered to an exterior surface of the sleeve;
    the liner having an unstretched state wherein the plastic film is solid and stretched state wherein in the plastic film is porous to expose a resinous material in the sleeve to the damaged section of the pipe.

9. The apparatus of claim 8 further comprising a tubular non-stick bladder material disposed between the inflatable plug and the liner.

10. The apparatus of claim 8 wherein the plastic film has a thickness of approximately 1-2 mils.

11. The apparatus of claim 8 wherein the plastic film is formed from a TPU material.

12. The apparatus of claim 8 wherein the plastic film is formed from a PVC material.

13. The apparatus of claim 8 wherein the tubular sleeve includes a fabric fiber material.

14. The apparatus of claim 8 wherein the tubular sleeve having a non-stretched diameter and being stretchable to a diameter at least 50% greater than the non-stretched diameter.

15. The apparatus of claim 8 wherein the liner being impregnated with resin and the plastic film contains the resin in the liner prior to installation of the liner.

16. A method of lining a damaged section of a pipe comprising:
    providing a liner including a tubular sleeve of resin absorbent material and a plastic film adhered to an exterior surface of the sleeve;
    impregnating the liner with a resinous material capable of curing and hardening;
    moving the liner into the pipe to a position adjacent the damaged section of the pipe;
    stretching the liner from an unstretched state where the plastic film is solid to a stretched state where the plastic film is porous to expose the resinous material and tubular sleeve to the damaged section of the pipe;
    pressing the liner against the damaged section of pipe; and
    allowing the resinous material to cure and harden.

17. The method of claim 16 wherein the pipe is a main sewer pipe and the step of moving the liner into the pipe to a position adjacent the damaged section of the pipe is performed by pull-in place process.

18. The method of claim 16 wherein the pipe is a lateral sewer pipe and the step of moving the liner into the pipe to a position adjacent the damaged section of the pipe is performed pushing the liner in place.

19. The method of claim 16 wherein the plastic film has a thickness of approximately 1-2 mils.

20. The method of claim 16 wherein the plastic film is formed from a TPU material.

21. The method of claim 16 wherein the plastic film is formed from a PVC material.

22. The method of claim 16 wherein the tubular sleeve having a non-stretched diameter and being stretched to a diameter approximately 50% greater than the non-stretched diameter.

23. A method of lining a damaged section of a pipe comprising:
- taking a liner including a tubular sleeve of resin absorbent material and a plastic film adhered to an exterior surface of the sleeve;
- impregnating the liner with a resinous material capable of curing and hardening;
- positioning the liner around an elongated inflatable plug;
- moving the inflatable plug with liner into the pipe to a position adjacent the damaged section of the pipe;
- inflating the inflatable plug to stretch the liner from an unstretched state where the plastic film is solid to a stretched state where the plastic film is porous to expose the resinous material and tubular sleeve to the damaged section of the pipe;
- pressing the liner against the damaged section of pipe;
- allowing the resinous material to cure and harden; and
- removing the inflatable plug from the pipe.

* * * * *